United States Patent [19]
Okochi et al.

[11] Patent Number: 5,315,496
[45] Date of Patent: May 24, 1994

[54] CURRENT RESONANCE CONVERTER HAVING OVERLOAD DETECTING FUNCTION

[75] Inventors: Sadao Okochi, Fussa; Terutaka Takoda, Ome, both of Japan

[73] Assignee: Kabushiki Kaisha Toshiba, Kanagawa, Japan

[21] Appl. No.: 40,574

[22] PCT Filed: Jan. 29, 1991

[86] PCT No.: PCT/JP91/00093
§ 371 Date: Jul. 24, 1991
§ 102(e) Date: Jul. 24, 1991

Related U.S. Application Data

[63] Continuation of Ser. No. 721,544, Jul. 24, 1991, abandoned.

[30] Foreign Application Priority Data

Jan. 29, 1990 [JP] Japan .................. 2-18544

[51] Int. Cl.⁵ .......................................... H02M 3/335
[52] U.S. Cl. .................................. 363/21; 363/56
[58] Field of Search ............ 363/17, 20, 21, 28, 363/56, 91, 97; H02M 3/28

[56] References Cited

U.S. PATENT DOCUMENTS

| | | | |
|---|---|---|---|
| 4,065,802 | 12/1977 | Mizukawa et al. | 361/18 |
| 4,785,387 | 11/1988 | Lee et al. | 363/21 |
| 4,797,803 | 1/1989 | Carroll | 363/97 |
| 4,931,918 | 6/1990 | Inon et al. | 363/19 |
| 5,053,937 | 10/1991 | Bloeckl | 363/16 |
| 5,073,849 | 12/1991 | Morris | 363/21 |

FOREIGN PATENT DOCUMENTS

| | | |
|---|---|---|
| 55-41445 | 10/1980 | Japan . |
| 59-25576 | 2/1984 | Japan . |
| 60-87669 | 5/1985 | Japan . |

*Primary Examiner*—William H. Beha, Jr.
*Attorney, Agent, or Firm*—Finnegan, Henderson, Farabow, Garrett & Dunner

[57] ABSTRACT

A current resonance converter including a resonant circuit composed of an inductance Lr and a capacitor Cr, a switching element SW connected to the resonant circuit in series so as to turn on and off the resonant circuit, an oscillating circuit VCO for driving the switching element SW, a strobe pulse generating circuit SPG adapted to generate a strobe pulse after a predetermined period of time elapses from the time when the switching element SW is turned on, and a controlling circuit CTL serving to reduce an oscillation frequency derived from the voltage controlled oscillator VCO or stop oscillation of the same while the case where an electric current flows through the resonant circuit in the forward direction when a strobe pulse is generated is recognized as a case where the converter is loaded with an overload is disclosed. With this construction, the converter can be constructed in smaller dimensions with a lighter weight while assuring protection when the converter is loaded with an overload.

17 Claims, 9 Drawing Sheets

LIGHT LOAD

RATED LOAD

OVERLOAD

OUTPUT FROM TIMER T1

OUTPUT FROM TIMER T2

OUTPUT FROM INVERTER INV

OUTPUT FROM AND GATE (STROBE PULSE)

CURRENT RESONANCE CONVERTER HAVING OVERLOAD DETECTING FUNCTION

This application is a continuation of application Ser. No. 07/721,544 filed Jul. 24, 1991, now abandoned.

TECHNICAL FIELD

The present invention relates generally to a current resonance converter. More particularly, the present invention relates to a circuit for protecting the current resonance converter from the influence of overcurrent.

BACKGROUND ART

A switching regulator for generating a direct current by switching a direct current at a high frequency, transforming the resultant current in a transformer and then rectifying the transformed current has advantageous features that it is constructed in small dimensions and operates at a high efficiency. By virtue of the foregoing advantageous features, the switching regulator has been widely used as a power supply unit for various electric instruments and equipments. In recent years, to reduce a load to be borne by a switching element and moreover improve operational efficiency, a current resonance converter of the type including a switching regulator added with a resonant circuit has been used increasingly.

With respect to the current resonance converter as constructed in the above-described manner, it is important from the viewpoint of protection of a switching element and an operational efficiency that an ON/Off operation is performed by the switching element while an electric current is maintained in the zero state (zero-current switching). To perform a zero-current switching operation, it is required that an intensity of electric current flowing through a resonance circuit assumes a value lower than a predetermined one. As the intensity of the electric current flowing through the resonant circuit is increased, components constituting the resonant circuit are excessively heated, resulting in the running life of each component being shortened. Under the foregoing circumstances, the current resonance converter is required to include a protection circuit for protecting it from the influence of an overcurrent.

To protect the current resonance converter from the influence of an overcurrent, a current transformer ha been hitherto arranged on the primary coil side of a transformer to measure an alternate current. Driving of the switching element is controlled based on the direct current which has been generated by detecting the alternate current, rectifying the alternate current and then smoothing the resultant current.

However, as long as the alternate current is detected by using the current transformer, it is practically difficult to protect the current resonant converter from an abnormal state such as short circuit or the like malfunction of an inductor and a capacitor constituting the resonant circuit. Another problem is that the conventional current resonance converter has a degraded property of responsiveness in respect of protection of the switching element because of arrangement of a smoothing circuit for smoothing an electric current outputted from the current transformer. Another problem is that the conventional current resonance converter is constructed in larger dimensions.

As described above, with respect to the protection circuit for the conventional current resonant converter, since an electric current flowing through a primary coil of the transformer is detected by the current transformer, it is difficult to detect an abnormal state due to short circuit of an inductance and a capacitor constituting a series resonant circuit. Consequently, the conventional current resonance converter has a degraded property of responsiveness in respect of protection of the switching element. In addition, the conventional current converter is unavoidably constructed in large dimensions with a heavy weight because of arrangement of the current transformer.

The present invention has been made in consideration of the aforementioned problems to be solved.

An object of the present invention is to provide a current resonance converter which makes it possible to protect the converter from an abnormal state due to short circuit or the like malfunction of an inductor and a capacitor constituting a resonant circuit.

Another object of the present invention is to provide a current resonance converter which has an excellent property of responsiveness in respect of protection of a switching element and moreover assures that the converter can be constructed in smaller dimensions with a lighter weight.

SUMMARY OF THE INVENTION

To accomplish the above objects, the present invention provides a current resonance converter including a series resonant circuit having an inductor and a capacitor connected thereto in series, a switching element connected to the series resonant circuit in series to tun on and off the series resonance circuit, an oscillating circuit for driving the switching element, electric current detecting means for detecting an electric current which flows through the series resonant circuit, a strobe pulse generating circuit adapted to generate a strobe pulse after a predetermined period of time elapses from the time when the switching element is turned on, and a controlling circuit for controlling the oscillating circuit while the case where an electric current flows through the series resonant circuit in the forward direction when the strobe pulse is generated is recognized as a case where the converter is loaded with an overload.

A capacitor for inducing a resonance may be disposed, e.g., on the secondary coil side of a transformer. In addition, a leakage inductance may be employed for an inductor for inducing a resonance.

With the current resonance converter of the present invention, the electric current detecting means detects an electric current which flows through the circuit when a strobe pulse is generated. The controlling circuit controls the oscillating circuit for driving the switching element while the case where an electric current flows through the resonant circuit in the forward direction is recognized as a case where the converter is loaded with an overload.

With such construction, the converter of the present invention assures protection from any abnormal state due to short circuit or the like malfunction of a resonant inductor and a resonant capacitor. In addition, the converter of the present invention has an excellent property of responsiveness in respect of protection of the switching element.

DETAILED DESCRIPTION OF THE PREFERRED EMBODIMENT

Now, the present invention will be described in detail hereinafter with reference to the accompanying drawings which illustrate preferred embodiments of the present invention.

Figure 1:
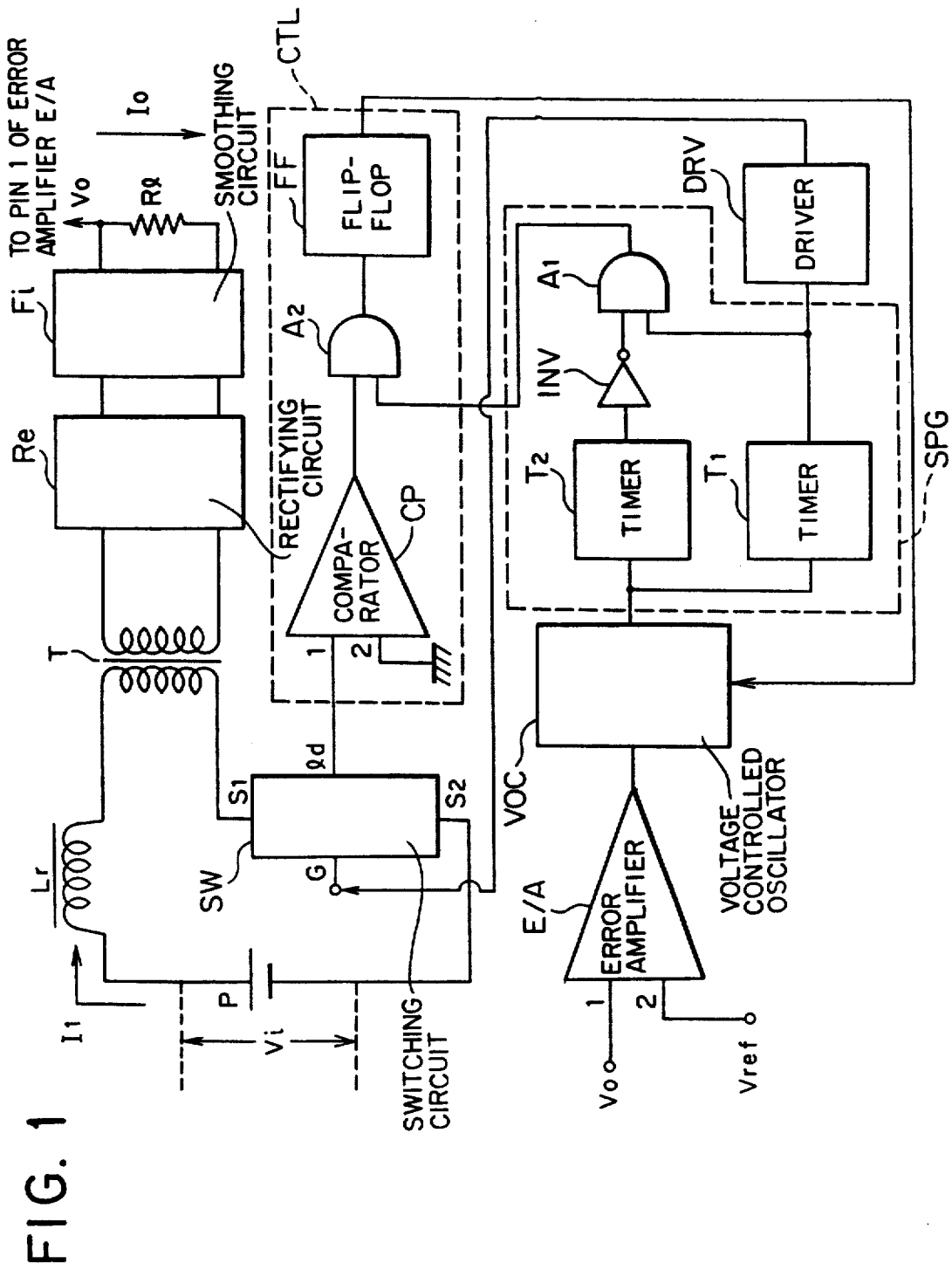
FIG. 1 is a circuit diagram which illustrates the structure of a current resonance converter in accordance with an embodiment of the present invention wherein the converter is employed for a switching supply.

FIG. 1 is a circuit diagram which illustrates the structure of a current resonance converter in accordance with an embodiment of the present invention with respect to a case where the converter is employed for a forward type current resonance switching supply unit.

In the drawing, reference character P designates a direct current supply having a voltage Vi. Reference character Lr designates a resonant inductor and reference character Cr designates a resonance capacitor. A direct current resonant circuit is constituted by the resonance inductor Lr and the resonance capacitor Cr. Reference character SW designates a switching element which has a function for detecting that an electric current flows through the direct current resonant circuit. The switching element SW will be described in more detail later. A transformer T is connected to opposite ends of the resonance capacitor Cr so as to take an energy out of t ser resonant circuit. The transformer T transforms an alternate current which is inputted into a primary coil thereof and then outputs the transformed alternate current to a secondary coil thereof. Reference character Re designates a rectifying circuit and reference character Fi designates a smoothing circuit. The rectifying circuit Re rectifies the alternate current which has been outputted to the secondary coil of the transformer T, while the smoothing circuit Fi smooths the rectified current. Reference character RL designates a load resistor. The direct current Vo which has been outputted from the smoothing circuit Fi is applied to the load resistor RL. Reference character E/A designates an error amplifier. The output voltage Vo is inputted into an input 1 of the error amplifier E/A from the smoothing circuit Fi, while a reference voltage Vref is inputted into an input 2 of the same. In response to the inputting into the both inputs 1 and 2, a voltage of which magnitude corresponds to a difference between the both inputs 1 and 2 is outputted from the error amplifier E/A. Reference character VCO designates a voltage controlled oscillator. The voltage controlled oscillator generates a series of pulses of which frequency corresponds to signals outputted from the error amplifier E/A. Reference characters T1 and T2 designate timers, respectively. The timers T1 and T2 maintain a "H" level of each pulse from the voltage controlled oscillator VCO for a predetermined period of time, respectively. Reference character INV designates an inverter. The inverter INV inverts a "H" level and a "L" level of the timer T2. Reference character A1 designates an AND gate. The AND gate A1 outputs a logical product of the output from the inverter INV and the output from the timer T1. A strobe pulse generating circuit SPG is constituted by the timers T1 and T2, the inverter INV and the AND gate A1.

Reference character DRV designates a driver. An output from the timer T1 is amplified by the driver DRV thereby to drive the switching element SW. Reference character CP designates a comparator. The comparator CP comparatively determines whether the voltage which has been inputted from an electric current detecting terminal Id of the switching element SW is plus or minus. When it is found from the result derived from the comparative determination that the foregoing voltage is plus, the comparator CP outputs a "H" level. Reference character A2 designates an AND gate. An output from the comparator CP and an output from the AND gate A1 are inputted into the AND gate A2, and a logical product of the output from the comparator CP and the output from the AND gate A1 is then outputted from the AND gate A2. Reference character FF designate a Flip-Flop. The Flip-Flop FF is set such that operation of the voltage controlled oscillator VCO is stopped when a "H" level is outputted from the AND gate A2. A controlling circuit CTL for controlling the voltage controlled oscillator VCO is constituted by the comparator CP, the AND gate A2 and the Flip-Flop FF.

Next, a circuit diagram for the switching element SW shown in FIG. 1 is illustrated in FIG. 2.

Figure 2A:
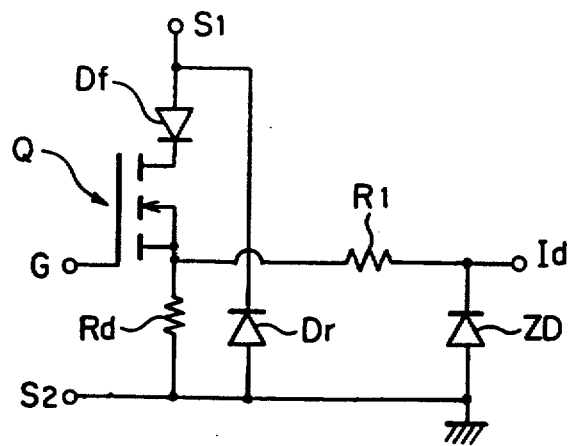
FIGS. 2(a)-2(c) are a few circuit diagrams each of which illustrates a circuit for a switching element.

FIG. 2(a) is a circuit diagram which illustrates a switching element having an electric current detecting function added thereto so as to serve for detecting an electric current by detecting a voltage drop due to a resistor Rd connected to a switching transistor Q in series.

Reference characters Df and Dr designate a diode, respectively. The diodes Df and Dr permit an electric current to flow to the switching transistor Q only in the forward direction. Reference character R1 designates a resistor. The resistor R1 divides the voltage drop due to the resistor Rd. Reference character ZD designates a Zener diode. The Zener diode ZD limits the level of the divided voltage so as to allow it to remain within a predetermined value.

Figure 2B:
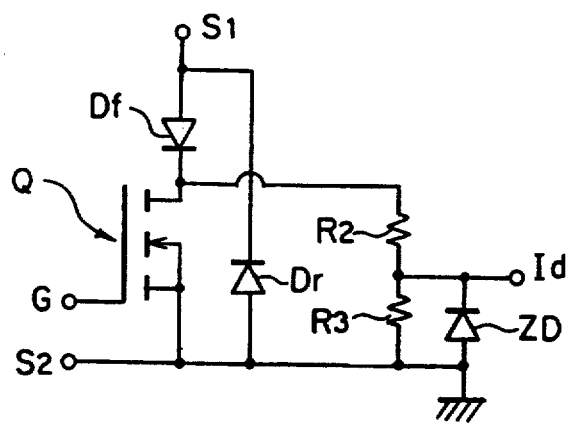

FIG. 2(b) is a circuit diagram which illustrates a switching element having an electric current detecting function added thereto so as to serve for detecting an electric current by detecting a voltage appearing between terminals of the switching transistor Q. Reference characters R2 and R3 designate a resistor, respectively. The resistors R2 and R3 divide the voltage between the terminals. Reference character ZD designates a Zener diode. The Zener diode ZD limits the level of the divided voltage so as to allow it to remain with a predetermined value.

Figure 2C:
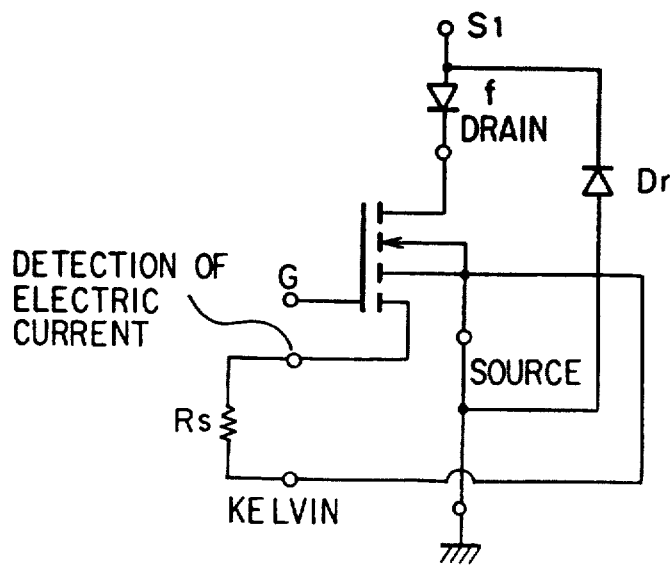

FIG. 2(c) is a circuit diagram which illustrates another modified example of the switching element.

This switching element (Model NO. MTP10N10M, manufactured by Motorola Company) is a MOS FET having an electric current detecting function added thereto. The MOS FET has ratings of 100V and 10A.

Next, operation of the forward type current resonance converter constructed in the above-described manner w described below.

First, the series resonant circuit is turned on and off by the switching element SW, causing a resonance to be induced by a sine wave-shaped electric current. The energy derived from the resonance is taken from the opposite ends of the resonant capacitor Cr via a primary coil of the transformer T. Then, the alternate current of which voltage has been converted depending on a coil ratio of the primary coil to the secondary coil of the transformer T appears on a secondary coil of the transformer T. The alternate current which has appeared on the secondary coil of the transformer T is rectified in the rectifying circuit Re and the rectified current is then transformed into a pulsating current. Thereafter, the pulsating current is smoothed in the smoothing circuit Fi, whereby a direct current voltage Vo is generated. The direct current voltage Vo is applied to the load resistor RL, causing an electric current Io to flow therethrough.

The direct current voltage Vo is transmitted to the error amplifier E/A from which the signal corresponding to a difference between the direct current voltage Vo and the reference voltage Vref serving as a target is inputted into the voltage controlled oscillator VCO. Then, the pulse of which frequency corresponds to the level of the foregoing signal is outputted from the voltage controlled oscillator VCO. Specifically, when the difference between the voltage Vref representative of a target output level and the output voltage Vo is large, the frequency of the voltage controlled oscillator VCO is controlled such that a switching operation is performed by the series resonant circuit at a high frequency. On the other hand, when the difference between the voltage Vref and the voltage Vo is small, the frequency of the voltage controlled oscillator VCO is controlled such that a switching operation is performed by the series resonant circuit at a low frequency.

Figure 3A:
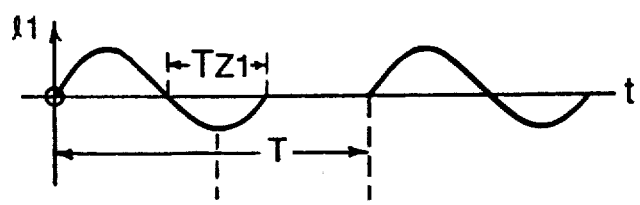
FIGS. 3(a)-3(h) are several graphs which illustrate an electric current flowing through a series resonant circuit as well as a voltage appearing on each terminal of a circuit for protecting the converter from the influence of an overcurrent.
Figure 3B:
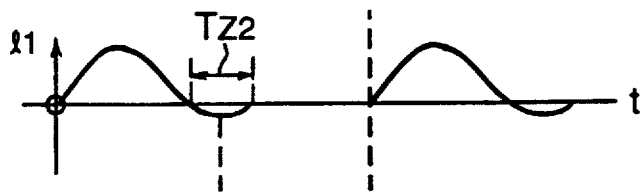

Each of FIGS. 3(a), (b) and (c) is a view which shows an electric current I1 flowing through the series resonant circuit wherein the plus direction of the ordinate represents the plus direction of the voltage derived from the direct current supply P. Each of FIGS. 3(d), (e), (f) and (h) is a view which shows an output pulse from the control circuit CTL and the strobe pulse generating circuit SPG.

As described above, the frequency of the voltage controlled oscillator VCO is controlled based on the difference between the output voltage Vo and the reference voltage Vref. This means that a period T in FIG. 3 is controlled based on the difference between the output voltage Vo and the reference voltage Vref. Specifically, when the output voltage Vo is lower than the reference voltage Vref, the voltage controlled oscillator VCO is controlled such that the period T of an output signal from the voltage controlled oscillator VCO is shortened. On the contrary, when the output voltage Vo is higher than the reference voltage Vref, the voltage controlled oscillator VCO is controlled such that the period T of an output signal from the voltage controlled oscillator VCO is elongated.

When the rising of the oscillation pulse outputted from the voltage controlled oscillator VCO is inputted into the timer T1 at the time of ta shown in FIG. 3, the "H" level is maintained for a predetermined period of time Tw1 which will be described later. Then, an output from the timer T1 is amplified by the driver DRV thereby to drive the switching element SW.

Figure 3C:
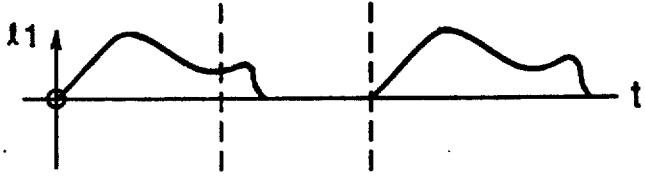
Figure 3D:
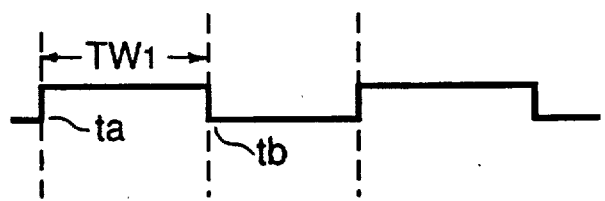
Figure 3E:
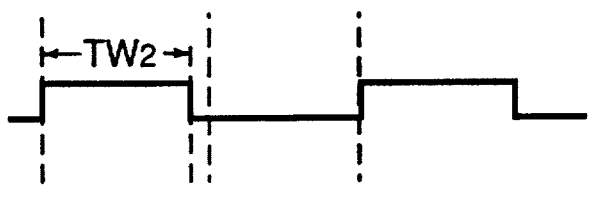
Figure 3F:
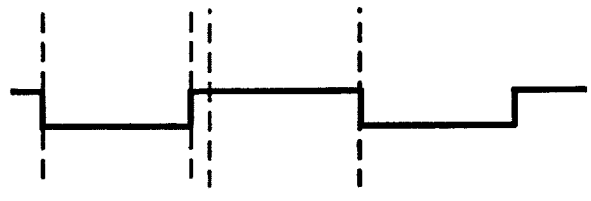
Figure 3G:
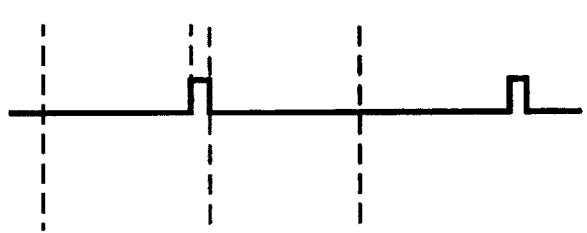

As shown in FIG. 3(e), the timer T2 serves to maintain the "H" level of a pulse from the voltage controlled oscillator VCO for a period of time Tw2 slightly shorter than the time Tw1 for which the timer T1 has been maintained at the "H" level. Then, an output from the timer T2 is inverted by the inverter INV and the inverted output is then transformed into a signal shown in FIG. 3(f) which in turn is inputted into the AND gate A1. A logical product of the output signal from the inverter INV and the output signal from the timer T1 is determined in the AND gate A1 and then outputted therefrom in the form of a strobe pulse. The strobe pulse is as shown in FIG. 3(g).

On the other hand, the comparator CP comparatively determines the voltage which has been outputted from the terminal Id of the switching element SW. When it is found that an electric current flows in the forward direction, the comparator CP outputs a signal having "H" level. When it is found that an electric current flows in the reverse direction, the comparator CP outputs a signal having a "L" level. Then, a logical product of the output from the comparator CP and the output from the AND gate A1 is determined in the AND gate A1.

In other words, if it is found that an electric current flows through the switching element SW in the forward direction when the strobe signal outputted from the AND gate A1 assumes the "H" level, an output from the AND gate A2 assumes a "H" level. Otherwise, the output from the AND gate A2 assumes a "L" level. When the output from the AND gate A2 assumes the "L" level, the Flip-Flop FF is reset such that the voltage controlled oscillator VCO is maintained in the oscillating state.

However, when an electric current flows through the switching element SW in the forward direction when a strobe pulse is generated, the output of the AND gate A2 is shifted to the "H" level and the Flip-Flop FF is then set such that oscillation of the voltage controlled oscillator VCO is stopped thereby to protect the converter from the influence of an overcurrent.

While the converter is loaded with a light load, an electric current flows through the series resonant circuit, as represented by a graph in FIG. 3(a). While the converter is loaded with a rated load, an electric current flows through the series resonant circuit, as represented by a graph in FIG. 3(b). When the switching element SW is turned off within the period of time Tz1 or Tz2 shown in the graph, this makes it possible to perform a zero-current switching operation.

However, while the converter is loaded with an overload, an electric current flows through the series resonant circuit, as represented by a graph in FIG. 3(c). At this time, since the electric current I1 is always kept in the plus state, a zero-current switching operation can not be performed any more.

To obviate this malfunction, the time Tw1 is set such that the time point tb when an output from the timer T1 is shifted from the "H" level to the "L" level is located in the proximity of the time when an intensity of electric current flowing through the series resonant circuit is minimized while the converter is loaded with a normal load. Once the timer T1 has been set in the above-described manner, the strobe signal assumes a "H" level just before the time point tb when the switching element is turned off. When an electric current flows through the switching element SW in the forward direction at that time, this is recognized as a case where the converter is loaded with an overload. Therefore, oscillation of the voltage controlled oscillator VCO is stopped with the result that the converter is properly protected from the influence of an overcurrent.

According to the aforementioned embodiment of the present invention, operation of the voltage controlled oscillator VCO is stopped directly by an output from the Flip-Flop FF. Alternatively, the voltage controlled oscillator VCO may be controlled such that an output level of the error amplifier E/A is set so as to allow the frequency of the voltage controlled oscillator VCO to be reduced depending on the output from the Flip-Flop FF.

Figure 3H:

In addition, according to the aforementioned embodiment of the present invention, a setting operation is performed such that the strobe signal assumes a "H" level just before the time point tb when an output from the timer T1 is shifted from the "H" level to the "L" level. Alternatively, a setting operation may be performed such that the strobe signal assumes a "H" level immediately after the time point tb, as shown in FIG. 3(h).

Figure 4:
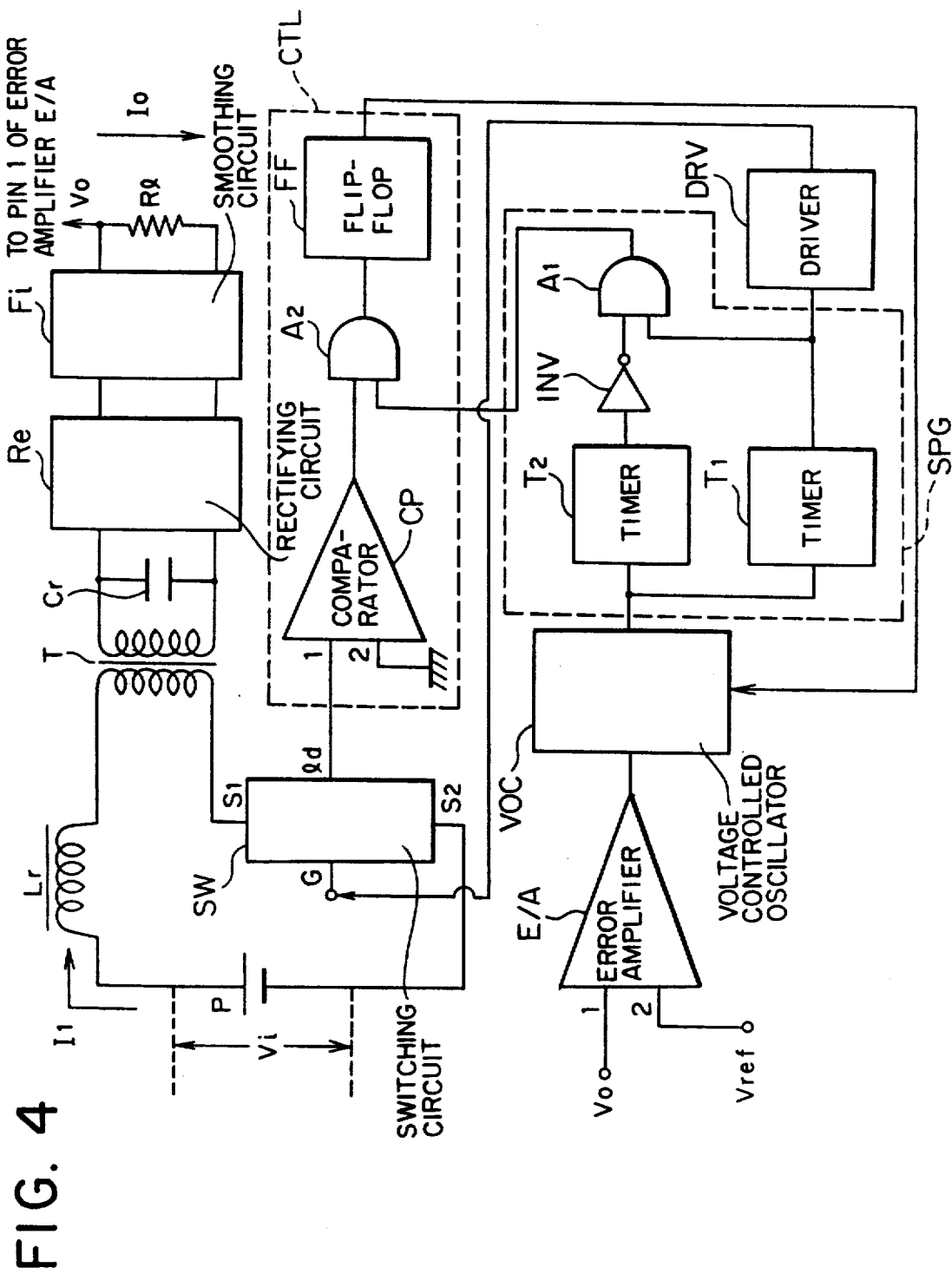
FIG. 4 is a circuit diagram which illustrates the structure of a current resonance converter in accordance with other embodiment of the present invention wherein the converter is employed for a switching supply.

Further, as shown in FIG. 4, the resonant inductor Lr may be arranged on the primary coil side of the transformer T in the series relationship and the resonant capacitor Cr may be arranged on the secondary coil side of the transformer T in the parallel relationship so that a zero-current switching operation is performed in response to the resonance induced by cooperation of the resonance inductor Lr with the resonance condenser Cr.

Figure 5:
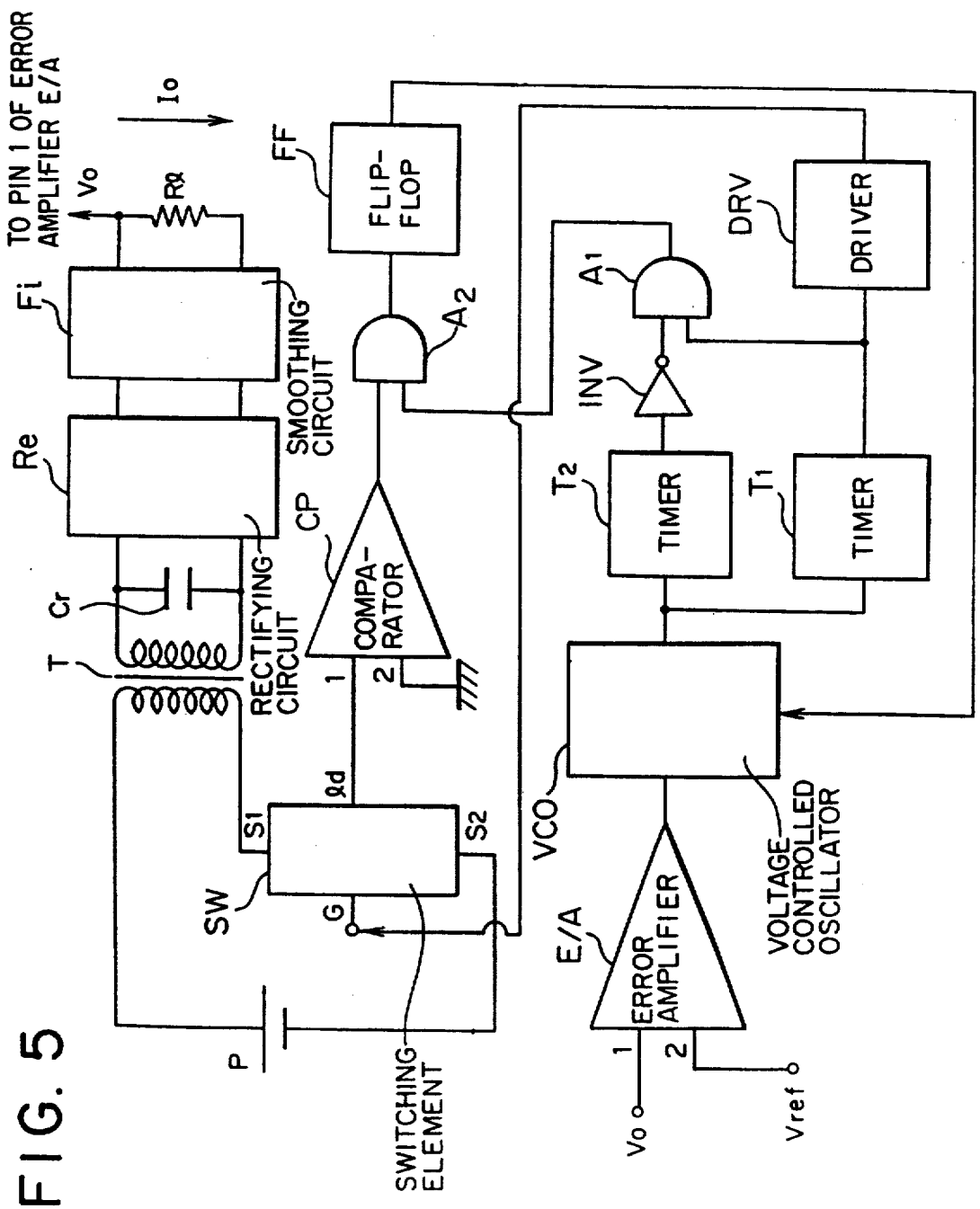
FIG. 5 is a circuit diagram which illustrates the structure of a current resonance converter in accordance with another embodiment of the present invention wherein the converter is employed for a switching supply.
Figure 6:
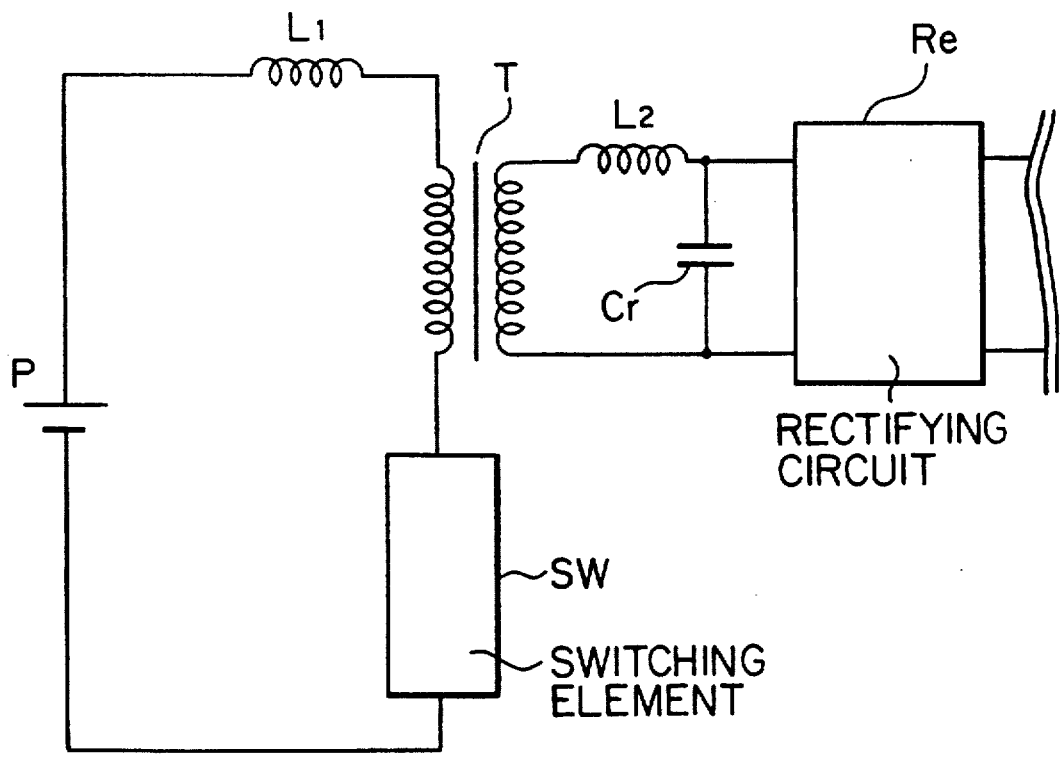
FIG. 6 is a view which illustrates an equivalent circuit corresponding to the primary coil side and the secondary coil side of a transformer T for the switching supply shown in FIG. 5.

Additionally, as shown in FIG. 5, there is a possibility that the resonance capacitor Cr is connected to the secondary coil side of the transformer T in the parallel relationship so as to induce a resonance because of the leakage inductance derived from the transformer T. FIG. 6 is a circuit diagram which shows an equivalent circuit corresponding to the transformer T and the resonant circuit for the current resonant converter shown in FIG. 5. As is apparent from the drawing, a resonance is induced between leakage inductances L1 and L2 from the transformer T and the resonant capacitor Cr, whereby a zero-current switching operation is performed.

Figure 7:
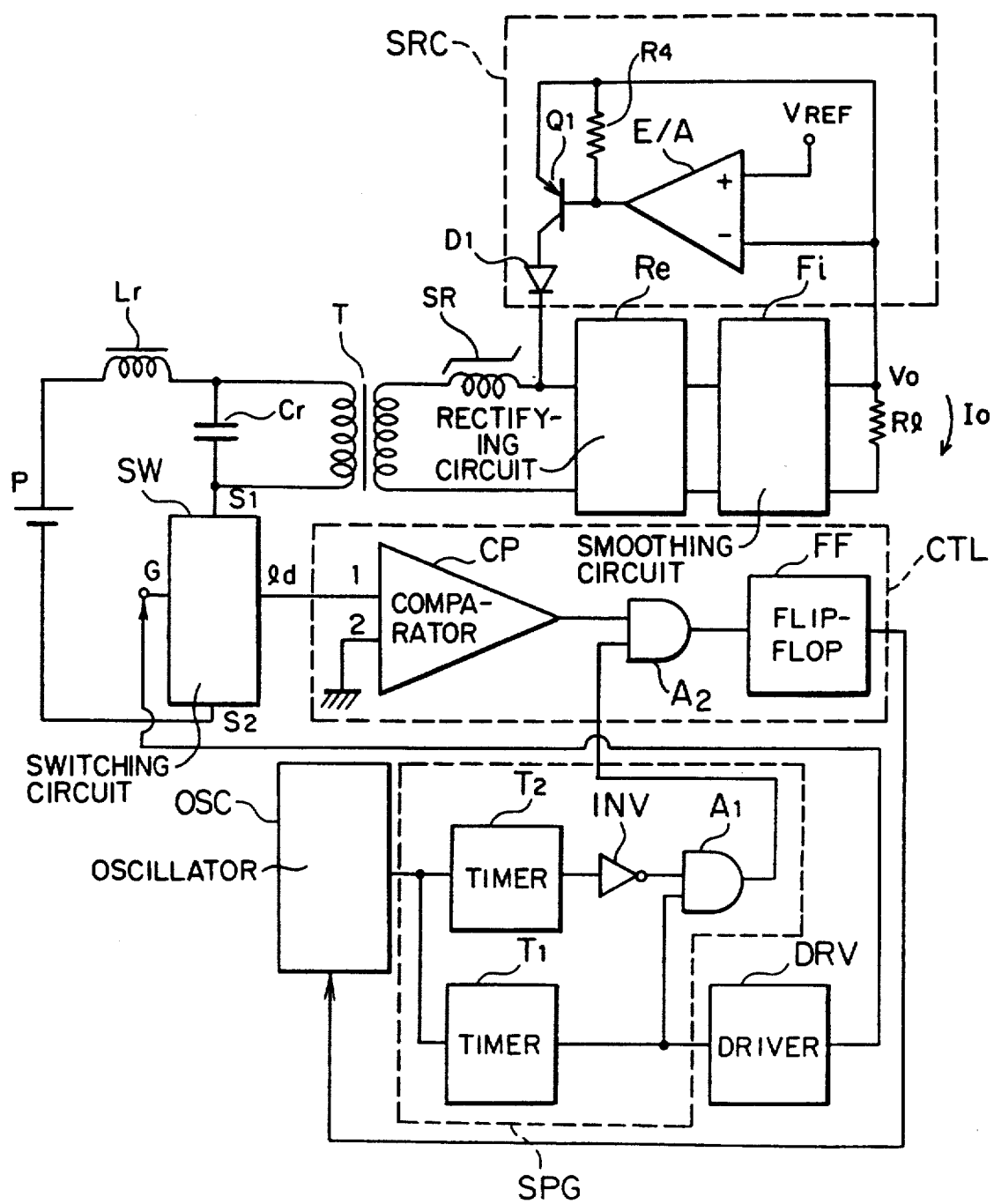
FIG. 7 is a circuit diagram which illustrates the structure of a current resonance converter in accordance with another embodiment of the present invention wherein the converter is employed for a switching supply so as to control a magnetic amplifier.

FIG. 7 is a circuit diagram which illustrates a current resonant converter in accordance with another embodiment of the present invention in a case where a magnetic amplifier is employed for the converter.

As shown in the drawing, a controlling circuit CTL, a strobe pulse generating circuit SPG and a series resonant circuit are constructed in the same manner as those in the embodiment shown in FIG. 1. According to this embodiment, an oscillator OSC adapted to generate a series of signals each having a fixed frequency is employed for the converter in place of the voltage controlled oscillator VCO shown in FIG. 1. In addition, a saturable reactor SR is interposed between the transformer T and the rectifying circuit Re, and a bias electric current of the saturable reactor SR is controlled by a bias electric current control circuit SRC.

The bias electric current control circuit SRC is constituted by a diode D1 for preventing an electric current from flowing in the reverse direction, an error amplifier E/A, a transistor Q1 for controlling an electric current and a resistance R4 for pulling up a base of the transistor Q1.

A signal is outputted from the error amplifier E/A corresponding to the output voltage Vo and the reference voltage Vref. As the rate of receiving an electric current via the base of the transistor Q1 in response to the output signal from the error amplifier E/A varies, the electric current flowing between an emitter and a collector varies correspondingly. Therefore, the bias electric current of the saturable reactor SR varies and thereby the rate of magnetizing the saturable reactor SR varies correspondingly. In this manner, an inductance of the saturable reactor SR varies depending on the rate of magnetizing the saturable reactor SR and a resistance value relative to an alternate current component varies, whereby a direct current voltage is properly controlled in response to an output from the error amplifier E/A.

Figure 8:
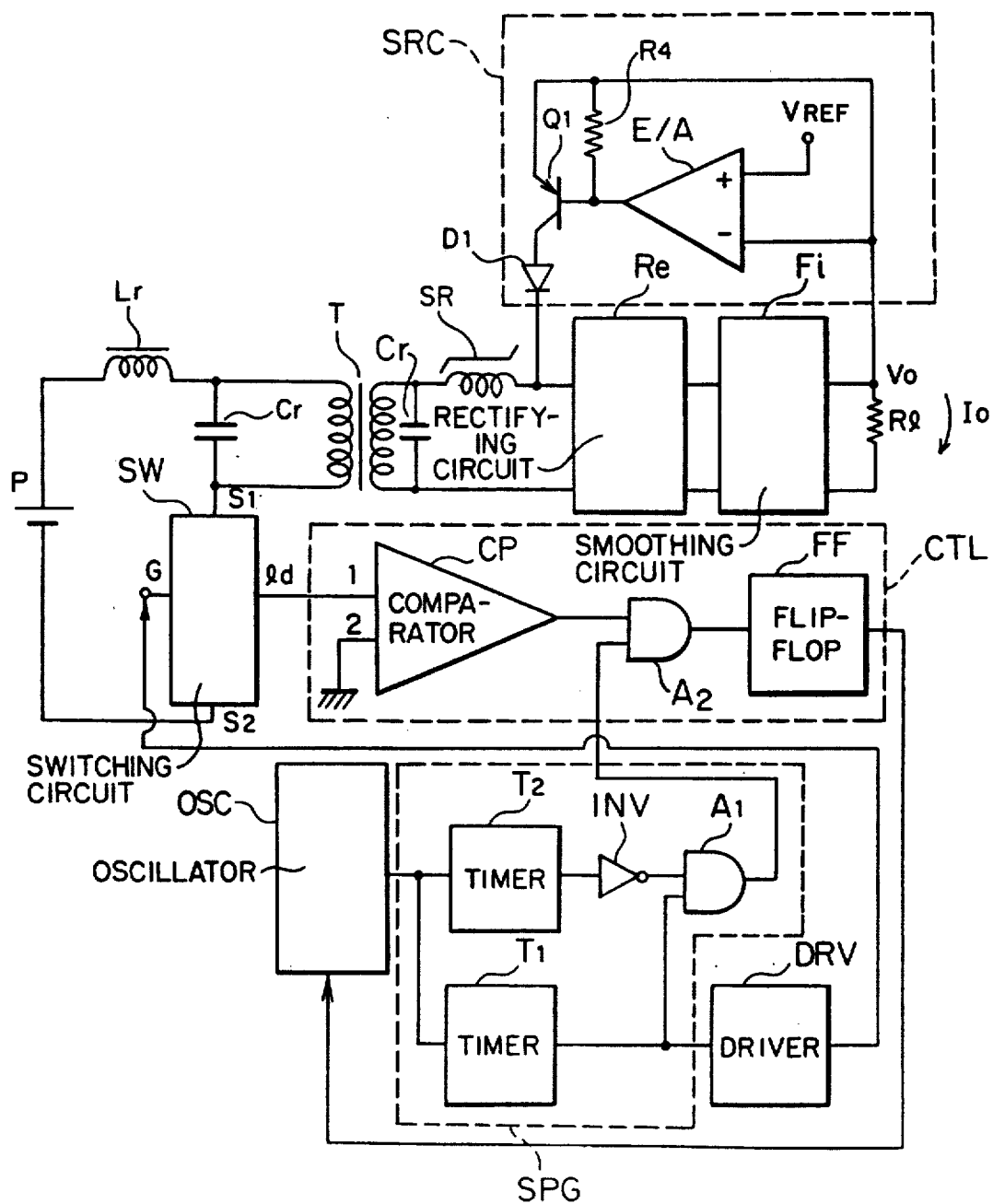
FIG. 8 is a circuit diagram illustrating a modification of the embodiment of FIG. 7, wherein a resonant condenser is connected in the secondary side of a transformer.
Figure 9:
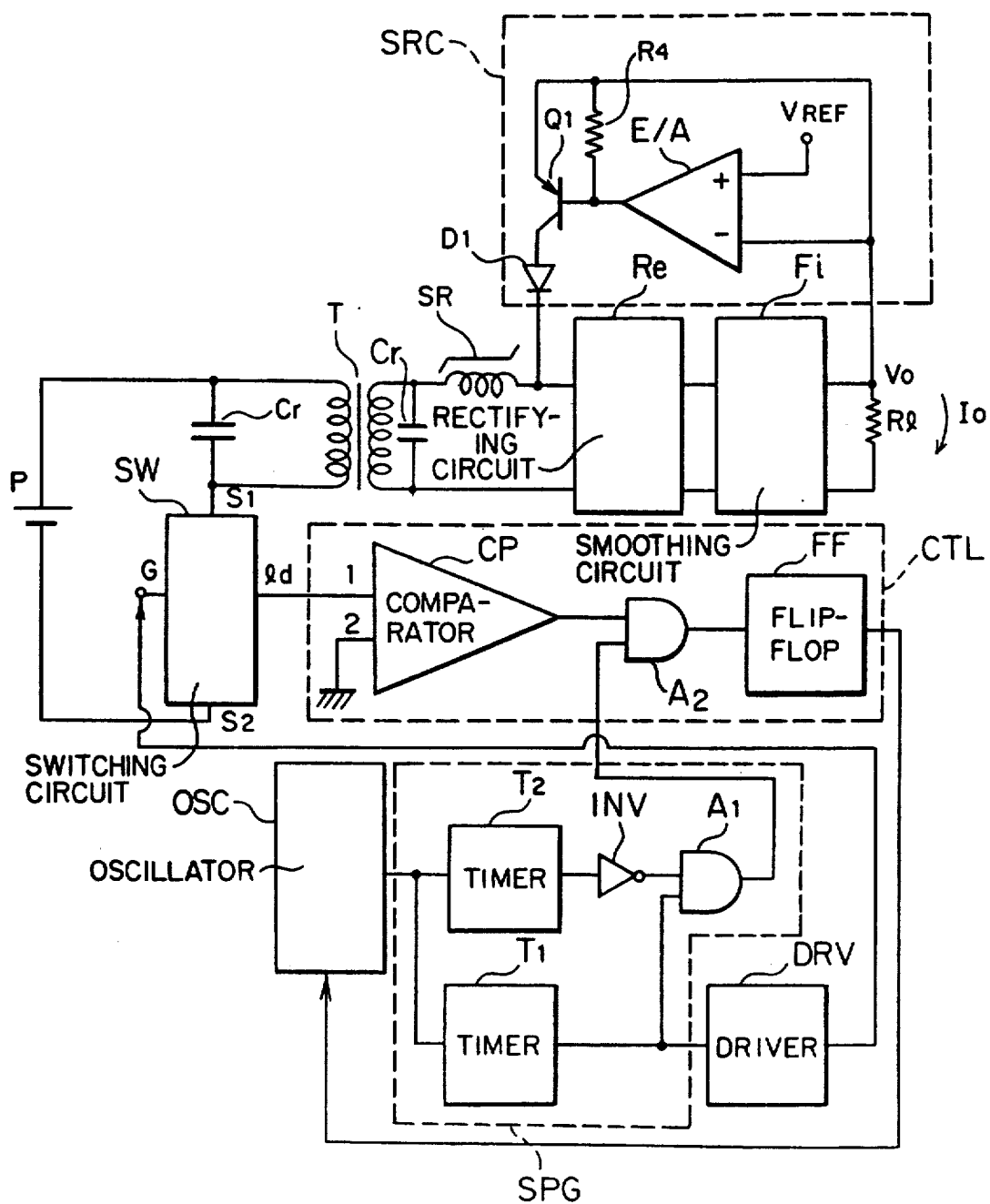
FIG. 9 is a circuit diagram illustrating a further modification of the embodiment of FIG. 7, wherein a resonant condenser is connected in the secondary side of a transformer and the purpose of a resonant inductor is served by the leakage inductance of the transformer.

Also with respect to the current resonant converter having a magnetic amplifier used in the above-described manner, there is a possibility, as seen in FIG. 8, that the resonance condenser Cr is arranged on the secondary coil side of the transformer T in the parallel relationship in the same manner as the case shown in FIG. 4 and FIG. 5. In addition, there is a possibility that the leakage inductance from the transformer T is utilized as an inductance for inducing a resonance, as illustrated in FIG. 9.

Therefore, with the forward type current resonant converter in accordance with the embodiment of the present invention, the detection of an electric current flowing through the resonant circuit assures protection from an abnormal state such as short circuit of the resonant inductor Lr and the resonance capacitor Cr or the like malfunction. Further, a property of responsiveness in respect of protection of the switching element can be greatly improved.

Additionally, according to the embodiment of the present invention, since detection of an electric current is accomplished based on the voltage drop of each resistor, a current transformer having a heavy weight is not required. This makes it possible for the current resonance converter to be constructed in smaller dimensions with a lighter weight.

INDUSTRIAL APPLICABILITY

With the current resonance converter of the present invention, an electric current flowing through the resonant circuit can be detected when a strobe pulse is generated. When the electric current flows through the resonant circuit in the forward direction, this is recognized as a case where the converter is loaded with an overload. Then, the switching element is driven according to the result of the recognition. Therefore, the current resonant converter of the present invention makes it possible to protect the converter from an abnormal state such as short circuit of the resonance inductor and the resonance capacitor or the like malfunction. In addition, the current resonance converter of the present invention has an excellent property of responsiveness in respect of protection of the switching element.

We claim:

1. A current resonance converter comprising;
a transformer;
a series resonant circuit having an inductor and a capacitor connected thereto in series, said capacitor connected to a primary coil of said transformer in parallel;
a switching element connected to said resonant circuit in series to turn on and off said series resonant circuit;
an oscillating circuit for driving said switching element;
electric current detecting means for detecting an electric current which flows through said series resonant circuit;
a strobe pulse generating circuit adapted to generate a strobe pulse after a predetermined period of time elapses from the time when said switching element is turned on, and
a controlling circuit for controlling said oscillating circuit, said controlling circuit further comprising a comparator for comparing a reference value with a value of electric current flowing through said series resonant circuit in a forward direction and outputting a comparator signal, an AND gate for performing a logical operation on said comparator signal and said strobe pulse, and a flip-flop for controlling said oscillating circuit in response to a logical signal from said AND gate.

2. The current resonance converter as claimed in claim 1, wherein said controlling circuit performs a controlling operation so as to reduce an oscillation frequency derived from said oscillating circuit when said controlling circuit determines that said converter is loaded with an overload.

3. The current resonance converter as claimed in claim 1, wherein said controlling circuit stops operation of said oscillating circuit when said controlling circuit determines that said converter is loaded with an overload.

4. A current resonance converter comprising;
a transformer,
an inductor connected to a primary coil of said transformer in series,
a switching element for turning on and off an electric current which flows through said primary coil of said transformer,
a capacitor connected to a secondary coil of said transformer in parallel to constitute a resonance circuit in cooperation with said inductor,
electric current detecting means for detecting an electric current which flows through said primary coil of said transformer,
a strobe pulse generating circuit adapted to generate a strobe pulse after a predetermined period of time elapses from the time when said switching element is turned on, and
a controlling circuit for controlling said electric current flowing through said primary coil of said transformer while the case where an electric current flows through said primary coil of said transformer in the forward direction when said strobe pulse is generated is recognized as a case where said converter is loaded with an overload.

5. The current resonance converter as claimed in claim 4, wherein said controlling circuit performs a controlling operation so as to reduce an on/off operation of said switching element when said controlling circuit determines that said converter is loaded with an overload.

6. The current resonance converter as claimed in claim 4 wherein said controlling circuit stops an on/off operation of said switching element when said controlling circuit determines that said converter is loaded with an overload.

7. A current resonance converter comprising;
a transformer,
a switching element for turning on and off an electric current which flows through a primary coil of said transformer,
a capacitor connected to a secondary coil of said transformer in parallel to constitute a resonant circuit in cooperation with a leakage inductance of said transformer,
electric current detecting means for detecting an electric current which flows through said primary coil of said transformer,
a strobe pulse generating circuit adapted to generate a strobe pulse after a predetermined period of time elapses from the time when said switching element is turned on, and
a controlling circuit for controlling said electric current flowing through said primary coil of said transformer while the case where an electric current flows flows through said primary coil of said transformer in the forward direction when said strobe pulse is generated is recognized as a case said converter is loaded with an overload.

8. The current resonance converter as claimed in claim 7, wherein said controlling circuit performs a controlling operation so as to reduce an on/off operation of said switching element when said controlling circuit determines that said converter is loaded with an overload.

9. The current resonance converter as claimed in claim 7, wherein said controlling circuit stops an on/off operation of said switching element when said controlling circuit determines that said converter is loaded with an overload.

10. The current resonance converter as claimed in any one of claims 4 to 9, wherein an output voltage is controlled by using a magnetic amplifier.

11. A current resonance converter comprising:
a power supply of a direct current voltage;
a resonant circuit connected to one terminal of said power supply, the resonant circuit having an inductor and a capacitor connected thereto in series;
a transformer, connected to both terminals of the capacitor, for transforming an alternating current generated by the resonant circuit;
switching means, connected to said resonant circuit and another terminal of the power supply, for turning the resonant circuit on and off;
means for generating a strobe pulse after a predetermined period of time elapses from a time when said switching means is turned on;
means for rectifying the transformed alternating current and for outputting a direct current;

means for outputting a signal indicating a difference between a voltage of the direct current and a reference voltage;

means for controlling an on/off timing of the switching means in accordance with the signal;

detecting means for detecting an electric current which flows through the resonant circuit; and means for stopping operation of the on/off timing when the detecting means detects a forward current which flows through the resonant circuit when said strobe pulse is generated.

12. The current resonance converter as claimed in claim 11, wherein said predetermined period of time is shorter than a cycle of resonance of said resonant circuit.

13. A current resonance converter comprising:
a transformer;
a series resonant circuit having an inductor and a capacitor connected therein in series, said capacitor connected to one of a primary and secondary coil of said transformer in parallel;
a switch means connected to said series resonant circuit to turn on and off said series resonant circuit;
an oscillating circuit means for driving said switch means so as to turn said switch means on and off;
electric current detecting means for detecting an electric current which flows through said series resonant circuit;
a strobe pulse generating means for generating a strobe pulse after a predetermined period of time elapses from a time when said switching element is turned on; and
a controlling means for controlling said oscillating circuit means so as to avoid an overload of said current resonance converter by stopping operation of said oscillating circuit when said electric current detecting means detects a forward current which flows through said series resonance circuit when said strobe pulse is generated.

14. A current resonance converter comprising:
a series resonant circuit having an inductor and a capacitor connected thereto in series,
a switching element connected to said series resonant circuit in series to turn on and off said series resonant circuit,
an oscillating circuit for driving said switching element,
electric current detecting means for detecting an electric current which flows through said series resonant circuit,
a strobe pulse generating circuit adapted to generate a strobe pulse after a predetermined period of time elapses from the time when said switching element is turned on, and
a controlling circuit for controlling said oscillating circuit, the case wherein an electric current flowing through said series resonant circuit in the forward direction when said strobe pulse is generated being recognized as a case where said converter is loaded with an overload,
an output circuit including a magnetic amplifier for producing an output voltage in response to the turn on and off of said series resonant circuit by said switching element, and
means for deriving a signal, indicative of a difference between said output voltage and a reference voltage, for varying the inductance of said magnetic amplifier in a manner to control said output voltage.

15. The current resonance converter as claimed in claim 14, wherein said controlling circuit performs a controlling operation so as to reduce an oscillation frequency derived from said oscillating circuit when said controlling circuit determines that said converter is loaded with an overload.

16. The current resonance converter as claimed in claim 14, wherein said controlling circuit stops operation of said oscillating circuit when said controlling circuit determines that said converter is loaded with an overload.

17. A current resonance converter comprising:
a transformer;
a series resonant circuit having an inductor and a capacitor connected therein in series, said capacitor connected to one of a primary and secondary coil of said transformer in parallel;
a switch means connected to said series resonant circuit to turn on and off said series resonant circuit;
an oscillating circuit means for driving said switch means so as to turn said switch means on and off;
electric current detecting means for detecting an electric current which flows through said series resonant circuit;
a strobe pulse generating means for generating a strobe pulse after a predetermined period of time elapses from a time when said switching element is turned on; and
a controlling means for controlling said oscillating circuit means so as to avoid an overload of said current resonance converter by reducing an oscillation frequency of said oscillating circuit when said electric current detecting means detects a forward current which flows through said series resonance circuit when said strobe pulse is generated.

* * * * *

UNITED STATES PATENT AND TRADEMARK OFFICE
CERTIFICATE OF CORRECTION

PATENT NO. : 5,315,496
DATED : May 24, 1994
INVENTOR(S) : Sadao Okochi et al.   PAGE 1 of 2

It is certified that error appears in the above-indentified patent and that said Letters Patent is hereby corrected as shown below:

Claim 1, Column 9, line 8, after "comprising" change ";" to --:--.

Claim 4, Column 9, line 47, after "comprising" change ";" to --:--.

Claim 7, Column 10, line 14, after "comprising" change ";" to --:--.

Column 10, line 34, delete (second occurrence) of "flows".

Column 10, line 36, after "case" insert --where--.

Claim 14, Column 11, line 42, after "comprising" change ";" to --:--.

Column 11, line 44, after "series" change "," to --;--.

Column 11, line 47, after "circuit" change "," to --;--.

UNITED STATES PATENT AND TRADEMARK OFFICE
CERTIFICATE OF CORRECTION

PATENT NO. : 5,315,496
DATED : May 24, 1994
INVENTOR(S) : Sadao Okochi et al.

It is certified that error appears in the above-indentified patent and that said Letters Patent is hereby corrected as shown below:

Claim 14, Column 11, line 49, after "element" change "," to --;--.

Column 11, line 52, after "circuit" change "," to --;--.

Column 12, line 2 after "on" change "," to --;-- and delete "and".

Column 12, line 8, after "overload" change "," to --;--.

Column 12, line 12, after "element" change "," to --;--.

Signed and Sealed this

Fourteenth Day of March, 1995

Attest:

BRUCE LEHMAN

*Attesting Officer*  *Commissioner of Patents and Trademarks*